United States Patent [19]
Irie et al.

[11] Patent Number: 6,075,112
[45] Date of Patent: Jun. 13, 2000

[54] CURABLE SILICONE COMPOSITION FOR VIBRATION-ISOLATING LAMINATE

[75] Inventors: Masakazu Irie; Takahiro Sato; Hiroji Enami, all of Chiba Prefecture, Japan

[73] Assignee: Dow Corning Toray Silicone Co., Ltd., Tokyo, Japan

[21] Appl. No.: 09/388,707

[22] Filed: Sep. 2, 1999

[51] Int. Cl.[7] .................................................. C08G 77/06
[52] U.S. Cl. ................... 528/15; 528/31; 528/32; 524/588; 524/862
[58] Field of Search ................... 528/15, 31, 32; 524/508, 862

[56] References Cited

U.S. PATENT DOCUMENTS

| | | | |
|---|---|---|---|
| 5,412,006 | 5/1995 | Fisher et al. | 524/47 |
| 5,449,560 | 9/1995 | Antheunis et al. | 428/447 |
| 5,966,578 | 10/1999 | Soutome et al. | 399/333 |

FOREIGN PATENT DOCUMENTS

| | | |
|---|---|---|
| 727 462 | 8/1996 | European Pat. Off. . |
| 40 313 565 | 6/1991 | Japan . |

*Primary Examiner*—Margaret G. Moore
*Attorney, Agent, or Firm*—William F. Boley

[57] ABSTRACT

A curable silicone composition for a vibration-isolating laminate comprising (A) 100 parts by weight of an organopolysiloxane having at least two alkenyl groups per molecule and a viscosity of 10–100,000 mPa.s at 25° C.; (B) an organopolysiloxane having at least two silicon atom-bonded hydrogen atoms per molecule and a viscosity of 1–100,000 mPa.s at 25° C. in an amount such that this component contains 0.2–5 mol of silicon atom-bonded hydrogen atoms per mole of alkenyl groups in component (A); (C) 1–300 parts by weight of an inorganic filler; and (D) a hydrosilylation catalyst in an amount sufficient to cure the composition, designed for forming a cured silicone product for a vibration-isolating laminate by laminating a metal layer and a cured silicone layer having a loss factor of 0.4 or greater and a storage modulus of $1.0 \times 10^5$ dyne/cm$^2$ or greater at 25° C. and a shear frequency of 0.2 Hz.

5 Claims, No Drawings

CURABLE SILICONE COMPOSITION FOR VIBRATION-ISOLATING LAMINATE

BACKGROUND OF INVENTION

The present invention is a curable silicone composition for a vibration-isolating laminate designed for forming a cured silicone layer for the vibration-isolating laminate, and more particularly to a curable silicone composition for a vibration-isolating laminate capable of yielding a cured silicone whose properties satisfy the requirements of the cured silicone layer for the vibration-isolating laminate, that is, a loss factor of 0.4 or greater and a storage modulus of $1.0 \times 10^5$ dyne/cm$^2$ or greater at 25° C. and a shear frequency of 0.2 Hz.

Known uses of vibration-isolating laminates, which are composed of laminates obtained by alternately laminating and bonding a plurality of elastic layers and metal layers, include applications aimed at reducing earthquake input from the ground to a structure during an earthquake, such as pillar elements of structures and vibration-isolating devices placed between structures and their foundations, as well as applications aimed at dampening vibrations in various types of equipment.

Products made of natural rubber or butyl rubber are commonly used as the elastic layers for such vibration-isolating laminates. Products made of silicone rubber have been proposed because of their low temperature dependence (see Japanese Unexamined Patent Applications (Kokai) 62-224742 and 63-51543).

Silicone rubber compositions obtained by the addition of low-polymerization methylphenylsiloxane/dimethylsiloxane copolymers with hydroxy blockage at both ends, as well as silicone rubber compositions characterized by the addition of fine silica powders whose surfaces have been modified with diphenylsilanediol have been proposed as the silicone rubber compositions for forming such silicone rubbers (see Japanese Examined Patent Applications (Kokoku) 1-19824 and 3-16388).

Such silicone rubber compositions are disadvantageous, however, in that they are incapable of yielding a cured silicone whose properties satisfy the requirements of a cured silicone layer for a vibration-isolating laminate, that is, a loss factor of 0.4 or greater and a storage modulus of $1.0 \times 10^5$ dyne/cm$^2$ or greater at 25° C. and a shear frequency of 0.2 Hz, or a cured silicone that has a type A durometer hardness of 10 or less, as defined in JIS K 6253, and a loss factor of 0.4 or greater and a storage modulus of $1.0 \times 10^5$ dyne/cm$^2$ or greater at 25° C. and a shear frequency of 0.2 Hz. Another drawback of such compositions is that the resulting vibration-isolating laminates have inadequate vibrational energy absorption capabilities and that the structural design of these vibration-isolating laminates is limited in terms of width.

The inventors perfected the present invention as a result of thoroughgoing research aimed at overcoming the aforementioned drawbacks. Specifically, it is an object of the present invention to provide a curable silicone composition for a vibration-isolating laminate that is capable of yielding a cured silicone whose properties satisfy the requirements of a cured silicone layer for the vibration-isolating laminate, that is, a loss factor of 0.4 or greater and a storage modulus of $1.0 \times 10^5$ dyne/cm$^2$ or greater at 25° C. and a shear frequency of 0.2 Hz.

SUMMARY OF INVENTION

A curable silicone composition suitable for forming the cured silicone of a vibration-isolating laminate formed by laminating metal layers and cured silicone layers, the cured silicone layer having a loss factor of 0.4 or greater and a storage modulus of $1.0 \times 10^5$ dyne/cm$^2$ or greater at 25° C. and a shear frequency of 0.2 Hz, comprising:

(A) 100 parts by weight of an organopolysiloxane having at least two alkenyl groups per molecule and a viscosity of 10–100,000 mPa.s at 25° C.;

(B) an organopolysiloxane having at least two silicon atom-bonded hydrogen atoms per molecule and a viscosity of 1–10,000 mPa.s at 25° C. in an amount such that this component contains 0.2–5 mol silicon atom-bonded hydrogen atoms per mole of alkenyl groups in component (A);

(C) 1–300 parts by weight of an inorganic filler; and (D) a catalyst for hydrosilylation reactions in a sufficient amount to cure the composition.

DESCRIPTION OF INVENTION

A distinctive feature of the curable silicone composition for a vibration-isolating laminate in accordance with the present invention is that this composition is capable of yielding a cured silicone whose properties satisfy the requirements of a cured silicone layer for a vibration-isolating laminate, that is, a loss factor of 0.4 or greater and a storage modulus of $1.0 \times 10^5$ dyne/cm$^2$ or greater at 25° C. and a shear frequency of 0.2 Hz. This vibration-isolating laminate is obtained by alternately laminating and bonding metal layers and at least one cured silicone layer, and can be used as a pillar element of a structure or as an element placed between a structure and its foundation. The present invention is a curable silicone composition capable of yielding such cured silicone. The curable silicone composition comprises:

(A) 100 parts by weight of an organopolysiloxane having at least two alkenyl groups per molecule and a viscosity of 10–100,000 mPa.s at 25° C.;

(B) an organopolysiloxane having at least two silicon atom-bonded hydrogen atoms per molecule and a viscosity of 1–10,000 mPa.s at 25° C. in an amount such that this component contains 0.2–5 mol silicon atom-bonded hydrogen atoms per mole of alkenyl groups in component (A);

(C) 1–300 parts by weight of an inorganic filler; and (D) a catalyst for hydrosilylation reactions in an amount sufficient to cure the composition.

The organopolysiloxane of component (A), which is the principal ingredient of the present composition, is an organopolysiloxane having at least two alkenyl groups per molecule and a viscosity of 10–100,000 mPa.s at 25° C. This is because a viscosity below this range tends to adversely affect the physical characteristics of the resulting cured silicone, whereas a viscosity above this range tends to yield a silicone composition that is not liquid. Examples of molecular structures for this organopolysiloxane (A) include straight and branched structures. In preferred practice, component (A) in the present composition is a mixture of (i) a branched organopolysiloxane having at least two alkenyl groups per molecule and a viscosity of 10–100,000 mPa.s at 25° C. and (ii) a linear organopolysiloxane having at least two alkenyl groups per molecule and a viscosity of 10–100,000 mPa.s at 25° C. The term "branched" refers to an organopolysiloxane in which the molecular structure is at least branched. Specifically, it may be an organopolysiloxane that has $RSiO_{3/2}$ units (where R is a monovalent hydrocarbon group) and/or $SiO_{4/2}$ units in the molecular structure thereof, and preferably an organopolysiloxane that has $RSiO_{3/2}$ units in the molecular structure thereof. Although the ratio of the branched organopolysiloxane of component (i) and the linear organopolysiloxane of component (ii) is not subject to any limitations, it is preferable for component (i) to be contained in component (A) in an amount ranging from 5 to 95 Wt. %. This is because the characteristics of the resulting cured silicone tend to be adversely affected if the content of component (i) in component (A) falls outside this range.

An organopolysiloxane described by the mean unit formula $$(R_3SiO_{1/2})_x(R_2SiO_{2/2})_y(RSiO_{3/2})_z$$

is preferred as the branched organopolysiloxane of component (i). The R in the above formula is a substituted or unsubstituted monovalent hydrocarbon group, specific examples of which include, for example, alkyl groups such as methyl, ethyl, and propyl; alkenyl groups such as vinyl, allyl, butenyl, and hexenyl; aryl groups such as phenyl and tolyl; and halogenated alkyl groups such as 3,3,3-trifluoropropyl. Although traces of hydroxyl groups may also be present, as may methoxy groups or other alkoxy groups, the requirement is that at least two R groups per molecule be alkenyl groups. Also in the above formula, x is a number from 0.01 to 10, y is a number from 80 to 99.7, z is a number from 1 to 5, and x+y+z=100.

The organopolysiloxane of component (B), which is the cross-linking agent of the present composition, has at least two silicon atom-bonded hydrogen atoms per molecule and a viscosity of 1–10,000 mPa.s at 25° C. This is because a viscosity at 25° C. below this range tends to adversely affect the physical characteristics of the resulting cured silicone, whereas a viscosity above this range tends to yield a silicone composition that does not have liquid properties. Examples of organic groups bonded to the silicon atoms in component (B) include monovalent hydrocarbon groups other than alkenyl groups, for example, alkyl groups such as methyl, ethyl, and propyl; aryl groups such as phenyl and tolyl; and halogenated alkyl groups such as 3,3,3-trifluoropropyl.

Such an organopolysiloxane of component (B) has at least two silicon atom-bonded hydrogen atoms per molecule, and although the molecular structure of the organopolysiloxane is not subject to any limitations, a linear organopolysiloxane having silicon atom-bonded hydrogen atoms solely at the two ends of the molecular chain is preferred. A dimethylsiloxane with dimethylhydrogensiloxy group blockage at both ends of the molecular chain can be cited as an example of such a linear organopolysiloxane having silicon atom-bonded hydrogen atoms solely at the two ends of the molecular chain. In addition, examples of linear organopolysiloxanes having silicon atom-bonded hydrogen atoms solely on the side chains thereof include methylhydrogen polysiloxanes with trimethylsiloxy group blockage at both ends of the molecular chain; dimethylsiloxane/methylhydrogensiloxane copolymers with trimethylsiloxy group blockage at both ends of the molecular chain; polymers in which some of the methyl groups in the aforementioned polymers are substituted with ethyl, propyl, or other alkyl group other than the methyl group, or with the phenyl group or 3,3,3-trifluoropropyl group; and mixtures containing two or more types of such polymers.

The content of component (B) in the present composition is such that component (B) contains 0.2–5 mol of silicon atom-bonded hydrogen atoms per mole of alkenyl groups in component (A). This is because the resulting silicone composition tends to be inadequately cured when the number of moles of silicon atom-bonded hydrogen atoms in component (B) per mole of alkenyl groups in component (A) falls short of the aforementioned range, and the physical characteristics of the resulting cured silicone tend to be adversely affected when the number of moles exceeds the aforementioned range.

The inorganic filler of component (C) is a component for imparting the desired mechanical strength to the cured silicone obtained by the curing the of the present composition. Examples include fumed silica, wet silica, ground quartz, titanium oxide, magnesium carbonate, zinc oxide, iron oxides, diatomaceous earth, carbon black, and other inorganic fillers, as well as inorganic fillers obtained by subjecting the surfaces of these inorganic fillers to hydrophobic treatments with organosilicon compounds.

The content of component (C) in the present composition should fall within a range of 1–300 parts by weight, preferably within a range of 5–100 parts by weight, and ideally within a range of 5–80 parts by weight, per 100 parts by weight of component (A). This is because the mechanical strength of the resulting cured silicone tends to decrease when the content of component (C) falls below this range, and the resulting silicone composition tends to lose its ability to demonstrate liquid properties when the content exceeds this range.

The hydrosilylation catalyst (i.e. to component (D)) promotes the curing of the present composition. Examples of component (D) include chloroplatinic acid, chloroplatinic acid alcohol solutions, platinum/olefin complexes, platinum/1,3-divinyl-1,1,3,3-tetramethyldisiloxane complexes, platinum supported on a carrier, and other platinum-based catalysts; tetrakis(triphenylphosphine)palladium, palladium black, mixtures with triphenylphosphine, and other palladium-based catalysts; and rhodium-based catalysts, of which platinum-based catalysts are particularly preferred.

The content of component (D) in the present composition should be sufficient for curing the present composition. When a platinum-based catalyst is used as component (D), the content of platinum metal in the catalyst added to the present composition preferably falls within a range of 0.01–1000 ppm (by weight), and preferably within a range of 0.1–500 ppm.

Other optional components may also be added to the present composition. Examples of such components include acetylene compounds, organophosphorus compounds, vinyl group-containing siloxane compounds, and other hydrosilylation reaction modifiers, as well as flame retardant additives, heat resistant additives, pigments, and dyes.

The curable silicone composition for a vibration-isolating laminate in accordance with the present invention is capable of yielding a cured silicone whose characteristics satisfy the requirements of an elastic layer for a vibration-isolating laminate. These requirements are a loss factor of 0.4 or greater and a storage modulus of $1.0 \times 10^5$ dyne/cm$^2$ or greater at 25° C. and a shear frequency of 0.2 Hz. The curable composition is also capable of yielding cured silicone having a loss factor of 0.4 or greater and a storage modulus of $1.0 \times 10^5$ dyne/cm$^2$ or greater at 25° C. and a shear frequency of 0.2 Hz, and having a rubber-like or gel-like product with a type A durometer hardness of 10 or less, as defined in JIS K 6253. The curable silicone composition is therefore suitable for forming the elastic layer of a vibration-isolating laminate used as a pillar element of a structure or as an element placed between a structure and its foundation.

The curable silicone composition for a vibration-isolating laminate in accordance with the present invention will now be described in detail through examples. The characteristics described with reference to the examples are values measured at 25° C. The characteristics of the cured silicone were measured in the following manner.

Loss Factor and Storage Modulus of Cured Silicone

A curable silicone composition was press molded for 5 minutes at 150° C., yielding a cured silicone in the form of a disc with a thickness of 6 mm and a diameter of 25 mm. The loss factor and storage modulus of the cured silicone were measured at 25° C. and a shear frequency of 0.2 Hz with the aid of a dynamic viscoelasticity meter (Dynamic Analyzer ARES™) manufactured by Rheometrics.

Hardness of Cured Silicone

A curable silicone composition was press molded for 5 minutes at 150° C., and the resulting cured silicone was measured by the type A durometer hardness tester defined in JIS K 6253.

EXAMPLES 1–8, COMPARATIVE EXAMPLES 1–2

The components described below were mixed in the proportions (parts by weight) shown in Table 1, and the mixtures were heat-treated for 1 hour at 170° C. at reduced pressure, yielding curable silicone compositions for vibration-isolating laminates. In Table 1, $SiH/SiCH=CH_2$ indicates the molar ratio of silicon atom-bonded hydrogen atoms in the organopolysiloxane of component (B) per mole of alkenyl groups in the organopolysiloxane of component (A) of the composition. The characteristics of the resulting curable silicone compositions are shown in Table 1.

Component a-1: Organopolysiloxane (vinyl group content: 0.22 Wt. %) of the mean unit formula

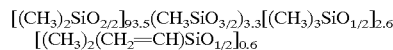

having a viscosity of 800 mPa.s

Component a-2: Organopolysiloxane (vinyl group content: 0.58 Wt. %) of the mean unit formula

having a viscosity of 870 mPa.s

Component a-3: Dimethylpolysiloxane (vinyl group content: 0.23 Wt. %) with dimethylvinylsiloxy group blockage at both ends of the molecular chain and a viscosity of 2000 mPa.s Component a-4: Dimethylsiloxane/methylvinylsiloxane copolymer (vinyl group content: 0.30 Wt. %) with trimethylsiloxy group blockage at both ends of the molecular chain and a viscosity of 7500 mPa.s Component b-1: Dimethylpolysiloxane (content of silicon atom-bonded hydrogen atoms: 0.13 Wt. %) with dimethylhydrogensiloxy group blockage at both ends of the molecular chain and a viscosity of 16 mPa.s Component b-2: Dimethylpolysiloxane (content of silicon atom-bonded hydrogen atoms: 0.06 Wt. %) with dimethylhydrogensiloxy group blockage at both ends of the molecular chain and a viscosity of 39 mPa.s Component b-3: Dimethylsiloxane/methylhydrogensiloxane copolymers (content of silicon atom-bonded hydrogen atoms: 0.32 Wt. %) with trimethylsiloxy group blockage at both ends of the molecular chain and a viscosity of 6 mPa.s Component c-1: Fumed silica with a specific surface of 130 $m^2/g$, whose surface was treated with hexamethyldisilazane to make hydrophobic.

Component c-2: High-purity crystalline quartz powder

Component d: Platinum complex of 1,3-divinyl-1,1,3,3-tetramethyldisiloxane (vinyl group content: 2.48 Wt. %) having a platinum concentration of 0.5 Wt. %

Component e: Mixture of 2 Wt. % 1-ethynyl-1-cyclohexanol and 98 Wt. % dimethylpolysiloxane (vinyl group content: 0.14 Wt. %) with dimethylvinylsiloxy group blockage at both ends of the molecular chain and a viscosity of 10,000 mPa.s Component f: Methylphenylpolysiloxane with hydroxy blockage at both ends of the molecular chain and a viscosity of 500 mPa.s

TABLE 1

| | | Examples | | | | | | | Comparative example |
|---|---|---|---|---|---|---|---|---|---|
| | | 1 | 2 | 3 | 4 | 5 | 6 | 7 | 1 |
| Composition | Component a-1 | — | — | — | — | — | 25 | 37.5 | — |
| | Component a-2 | 10 | 10 | 10 | 5 | 5 | 12.5 | — | — |
| | Component a-3 | 90 | 90 | 90 | 95 | 95 | 62.5 | 62.5 | 60 |
| | Component a-4 | — | — | — | — | — | — | — | 40 |
| | Component b-1 | 8.5 | — | 8.5 | 8.4 | 7.23 | 9.4 | — | 8.36 |
| | Component b-2 | — | 17.8 | — | — | — | — | — | — |
| | Component b-3 | — | — | — | — | 0.31 | — | — | — |
| | Component c-1 | 40 | 40 | 10 | — | 20 | 40 | 20 | 20 |
| | Component c-2 | — | — | 30 | 70 | 30 | — | 30 | 30 |
| | Component d | 0.1 | 0.1 | 0.1 | 0.1 | 0.1 | 0.1 | 0.1 | 0.1 |
| | Component e | 3.0 | 3.0 | 3.0 | 3.0 | 3.0 | 3.0 | 3.0 | 3.0 |
| | Component f | — | — | — | — | — | — | — | 3 |
| $SiH/SiCH = CH_2$ | | 1.0 | 1.0 | 1.0 | 1.0 | 0.95 | 1.0 | 1.0 | 1.0 |
| Loss coefficient | | 0.53 | 0.46 | 0.51 | 0.81 | 0.61 | 0.53 | 0.63 | 0.25 |
| Storage modulus (dyne/$cm^2$) | | $4.9 \times 10^5$ | $6.2 \times 10^5$ | $4.2 \times 10^5$ | $2.4 \times 10^5$ | $2.9 \times 10^5$ | $2.1 \times 10^5$ | $3.1 \times 10^5$ | $1.6 \times 10^6$ |
| Hardness | | 2 | 3 | 2 | 1 | 1 | 0 | 1 | 17 |

What is claimed is:

1. A curable silicone composition for a vibration-isolating laminate comprising (A) 100 parts by weight of a mixture of (i) an organopolysiloxane described by mean unit formula $(R_3SiO_{1/2})_x(R_2SiO_{2/2})_y(RSiO_{3/2})_z$, where R is a substituted or unsubstituted monovalent hydrocarbon group and at least two R groups per molecule are alkenyl groups, x is a number from 0.01 to 10, y is a number from 80 to 99.7, and z is a number from 1 to 5 and (ii) a linear organopolysiloxane having at least two alkenyl groups per molecule and a viscosity of 10–100,000 mPa.s at 25° C.;

(B) an organopolysiloxane having at least two silicon atom-bonded hydrogen atoms per molecule and a viscosity of 1–10,000 mPa.s at 25° C. in an amount such that said component contains 0.2–5 mol of silicon atom-bonded hydrogen atoms per mole of alkenyl groups in component (A);

(C) 1–300 parts by weight of an inorganic filler; and (D) a hydrosilylation catalyst in an amount sufficient to cure the composition, where the curable silicone composition when cured has a loss factor of 0.4 or greater and a storage modulus of $1.0 \times 10^5$ dyne/cm$^2$ or greater at 25° C. and a shear frequency of 0.2 Hz.

2. A curable silicone composition for a vibration-isolating laminate according to claim 1, wherein component (B) is a linear organopolysiloxane that has silicon atom-bonded hydrogen atoms solely at the two ends of the molecular chain.

3. A curable silicone composition for a vibration-isolation laminate according to claim 1, wherein component (D) is a platinum-based catalyst.

4. A curable silicone composition for a vibration-isolating laminate according to claim 1, wherein the cured composition has a type A durometer hardness of 10 or less as measured by JIS K 6253.

5. A curable silicone composition for a vibration-isolating laminate as defined in claim 1, wherein x+y+z is 100.

* * * * *